June 18, 1968   W. C. THOMPSON   3,388,471
STRESS ELIMINATOR FOR PARTIAL DENTURES
Filed July 28, 1965

INVENTOR,
WILLIAM C. THOMPSON;
BY
Calvin Brown,
ATTORNEY

United States Patent Office 3,388,471
Patented June 18, 1968

3,388,471
STRESS ELIMINATOR FOR PARTIAL DENTURES
William C. Thompson, 15548 Los Altos,
Hacienda Heights, Calif. 91745
Filed July 28, 1965, Ser. No. 475,429
4 Claims. (Cl. 32—7)

ABSTRACT OF THE DISCLOSURE

The stress eliminator for partial dentures is in three units. The first unit comprises a lingual bar carrying at each end a vertical post having a clasp for engagement with an abutment tooth and a tapered dowel spaced from the vertical post. The second unit which cooperates with the first unit comprises a split socket for receiving the dowel of the first unit, the second unit having a framework including two hooks one of which is attached to the framework and the other hook attached to the split socket. The second unit is adapted to be embedded within the saddle which holds the artificial teeth, the relationship being such that the proximal end of the saddle abuts the distal end of the post when the dowel is received within the socket of the second unit. The third unit comprises a U-shaped cantilever spring which interconnects the first and second units in such a manner as to permit the denture to move vertically under occlusial pressure.

---

The present invention relates to a stress eliminator for partial dentures and constitutes an improvement upon my U.S. Patent No. 2,982,024 issued May 2, 1961.

The present invention contemplates a precision attachment for partial dentures which overcomes breakage of certain parts thereof. Specifically, the present invention provides a structure which has strength and does not subject the saddle portion of the denture to breakage. As an example, the average denture includes a saddle usually formed of an acrylic resin, the saddle having artificial teeth embedded therein as a replacement of the natural teeth. The means for securing a saddle to the natural teeth generally comprises a lingual bar provided with clasps at ends thereof for anchorage to natural teeth. The method of securing the lingual bar to the denture in my Patent No. 2,982,024 consisted of a dowel at each end of the lingual bar, the dowel being received in a sutiable transverse opening in the saddle. Frequent breakage around the dowel occurred with the result that the saddle would come apart thus rendering the denture useless. The present invention overcomes the difficulties encountered by a structure such as just described. Furthermore, with the present invention I have reduced bulk and weight in the lingual bar as well as overcoming any possibility of wobble or teetering action of the denture and without distal torque on the abutment tooth.

An object of the invention is to provide a denture construction which eliminates stress in that the denture in actual use can only move in a vertical direction and thus prevents trauma of the abutment teeth for the denture.

A further object is a partial denture construction which preserves the residual alveolar ridge.

A further object is to provide a construction for a partial denture which limits movement of the partial denture tissueward under load.

A further object is to provide a denture wherein abutment teeth provide support for the denture and at the same time resist excessive shifting of the denture.

A further object is to provide denture structure which does not subject the abutment teeth to a distal torque.

Other objects of the invention will be apparent to those skilled in the art of dental prosthesis as set forth in the specification.

Figure 1:
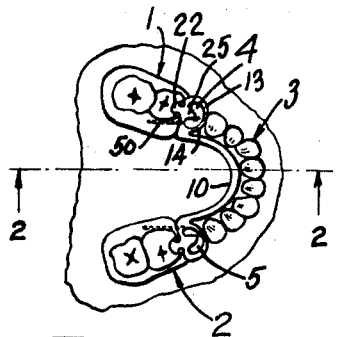
FIGURE 1 is an occlusial view of the teeth of the lower jaw showing a partial denture incorporating the invention.

Referring now to the drawing, I have shown partial dentures at 1 and 2 both of which replace the first and second molars while the teeth at 3 are natural. Thus, the abutment teeth at 4 and 5 are second bicuspids. This is purely illustrative and may vary depending upon the the number of natural teeth to be replaced in edentulous areas. One of the chief difficulties with partial dentures has been the attachment of dentures to natural abutment teeth in that the abutment teeth may be subjected to stresses which would provide a distal torque and trauma.

In the construction of my device, a lingual bar 10 is provided at each end with a post or tang 11 in substantially right angular relationship to the lingual bar 10 and with a clasp designated generally as 12 which extends laterally from the upper end of the post or tang 11. This clasp provides two arms 13 and 14 which are curved so as to embrace in part and partially surround the abutment tooth 4 or 5. As both ends of the lingual bar have similar dentures attached thereto, one end, to wit, that end adjacent the abutment tooth 4 will be described, the opposite end being of similar construction and the same numbers applying thereto. Thus post 11 is provided with clasp 12 comprising two arcuate arms 13 and 14 which are, in each instance, curved downwardly, upwardly and inwardly, as shown at 15 in FIGURE 4 and so that the ends of the arms approach as indicated at 16. In other words, the clasp arms are on a compound curve. This construction of the clasp is common in the art. An inverted tapered dowel 20 is spacedly secured for a portion of its length to the distal end of post 11 by means of a narrow web or connecting wall 21. The top of the dowel 20 is provided with a partially surrounding flange 22. The axis of the dowel 20 substantially parallels the distal end of post 11, see FIGURE 5. Substantially intermediate the clasp arms 13 and 14 and secured to post 11 is a mesial tab extension 25 which extension is provided on its lower surface with a bubular enlargement 26.

Figure 4:
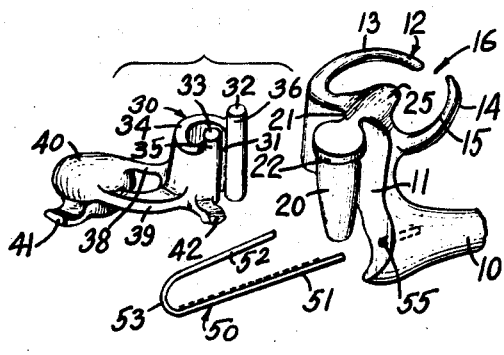
FIGURE 4 is a fragmentary detached view of elements embodied in the present invention.
Figure 6:
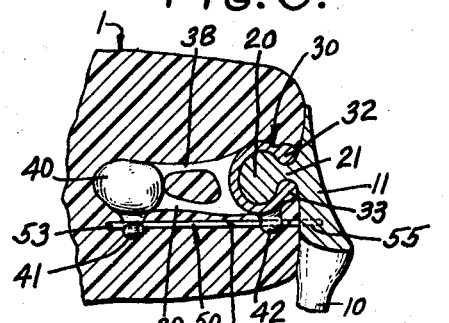
FIGURE 6 is a fragmentary sectional view on an enlarged scale on the line 6—6 of FIGURE 2; and, FIGURE 7 is a fragmentary, detached view of a modified form of certain elements of the invention.
Figure 5:
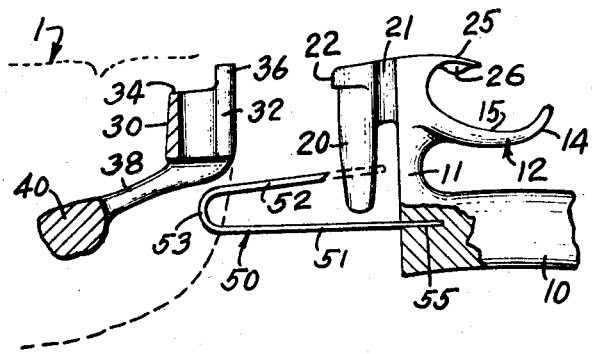
FIGURE 5 is a fragmentary, partially sectional detached view similar to that of FIGURE 4 but on an enlarged scale and showing the cantilever spring in engagement with the lingual bar.

As shown in FIGURES 4, 5, and 6, framework for each saddle includes a split socket member 30, the edges of which adjacent the split portion 31 are of cylindrical form, as shown at 32 and 33. The cylindrical edges extend from the base of the socket member to a point above the top edge 34 of the socket member, as shown in FIGURES 4 and 5 at 35 and 36. It will also be noted that the bore of the socket member is tapered to accommodate the taper of the dowel 20. Extending laterally and distally from the socket member are a pair of spaced arms 38 and 39 carrying at the outer ends thereof a bridging piece 40. The bridging piece 40 has a laterally extending hook 41 and the socket member 30 is provided with a laterally extending hook at 42. The hooks 41 and 42 lie on the lingual side of the framework and of the socket member although the hook 42 is positioned slightly above the plane of the hook 41. It will also be noted that the hook 41 is slightly curved upwardly while hook 42 is curved downwardly.

The means for interconnecting the socket member and associated framework with the lingual bar 10 and associated elements such as the tapered dowel comprises a U-shaped cantilever wire spring 50 having two legs 51 and 52, the leg 52 being shorter than the leg 51. The lingual bar is provided at each distal end thereof with an outwardly opening bore 55, which bore is adapted ot receive the leg 51 as shown in FIGURES 5 and 6. When the dowell 20 is positioned within the split tapered socket 30, the cylindrical edge portions at 32 and 33 have a close tolerance engagement with the distal end surface of the post 11 and the extended portions 35 and 36 of the cylindrical members are received in curved portions on opposite sides of the web 21. The arrangement is such that the occlusial end or top of the flange 22 of the tapered dowel and the occlusial ends of the portions 35 and 36 lie in the same plane. When the socket member is in position on the inverted dowel with the end of the leg 51 received in bore 55, the leg 50 engages the hook 41 and the leg 52 engages the hook 42.

It is assumed that the detures 1 and 2 have been provided with the necessary artificial teeth for the dentulous areas. It is also assumed that the lingual bar, clasp, and dowel have been provided. The saddle material may be an acrylic resin, with the framework comprising the socket member 30, arms 38, 39, the enlargement 40 and hook 41, all embedded within the saddle with the primimal end of the saddle adjacent the distal end of post 11. This construction positions the cylindrical portions 32 and 33 of the socket member in engagement with the distal end of the post, as shown in FIGURE 6.

When the denture saddle is molded to form, the spring 50 is embedded in the saddle with the leg 52 engaging the hook 42, and the leg 51 at the curved portion 53 engaging the hook 41 with the end of the leg 51 extending outwardly of the proximal end of the saddle for reception in the bore 55 of the lingual bar. The leg 51 prior to being embedded in the saddle is covered with a soft wax which spaces the leg in the saddle material and permits the leg to flex after the saddle is molded. The leg 52 is embedded in the saddle and does not flex. Thus, as illustrated, the end of the leg 51 adjacent the curved portion 53 is supported on the hook 41. Thus, when occlusial pressure is imposed upon the denture, the leg 51 flexes relative to its fulcrum point on the hook 41. The lingual bar with its clasp, is secured to a natural abutment tooth to the end that this portion of the device does not move under occlusial pressure.

It is to be noted that the acrylic resin of the saddle embeds the framework and surrounds in part the socket member by passing through the space between the legs 38 and 39 and encompassing the enlargement 40. When the clasps engage the second bicuspids, the tab extensions 25, and particularly the enlargements 26 lie in the sulci of the abutment teeth and hold the dentures firmly to the abutment teeth when the clasps engage the same.

Figure 7:
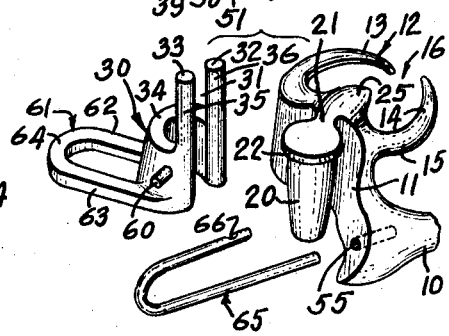

The modified form of construction shown in FIGURE 7 relates to the framework laterally connected to the split socket member and the same numbers of reference to this member as used for FIGURE 4, will be used for FIGURE 7 except where a change of construction is noted. In place of providing the downwardly directed hook 42, a pin 60 extends beyond the side wall of the split socket member 30 and the framework 61 which extends laterally from the socket member is U-shaped thus providing two arms or legs 62 and 63 interconnected by a curved end 64. The U-shaped member 61 is not provided with a hook such as 41. The spring 65 is essentially of the same construction as shown at 50 with the exception that the leg 52, the same number as applied to FIGURE 4 being applied here, is provided with a transverse notch 66. The remaining parts such as the clasp 12, post 11, lingual bar 10, and dowel 20 remain the same in construction as shown in FIGURE 4. The form of invention shown in FIGURE 7 operates in accordance with the description given for the form shown in FIGURES 2, 3, 4, and 5, save and except that the U-shaped member 61 is not provided with a hook extending from a side thereof. In place of the hook 42 extending from the socket member 30, a pin 60 is provided. The position of the pin 60 may vary in accordance with the actual fitting of the denture within a patient's mouth, as determined by the dentist. Thus after the dowel 20 has been received within the socket 30 the spring 65 has the long leg 51 received within the opening 55 and the notch 66 engages the pin 60. The fulcrum point for flexing of the spring will then be at the curved portion 53 joining the two legs 51 and 52 instead of being at the hook 41. The framework extension 61 is embedded within each saddle and lateral shifting is thereby prevented as is the case for the framework construction of FIGURE 4.

The operation, uses and advantages of my invention are as follows:

The stress eliminator of the form shown in FIGURES 2, 3, 4 and 5 is in three units. The first unit comprises the lingual bar 10 and associated elements comprising the vertical post 11 with its clasp for engaging an abutment tooth, and the dowel 20. The second unit called the denture unit is adapted to cooperate with the first unit and consitues a split socket for receiving the dowel of the first unit together with framework including two hooks, one attached to the framework and the other to the split socket all of which is embedded within the saddle holding the artificial teeth and so that the proximal end of the saddle abuts the distal end of the post when the dowel is received within the socket of the second unit. The third unit comprises the U-shaped cantilever spring which lingually interconnects the first and second units and permits the denture to move vertically under occlusial pressure.

The form of the invention shown in FIGURE 7 operates on the principle outlined above for FIGURES 2, 3, 4 and 5 with modifications in structure as previously described.

When the three units are interconnected, the combination functions as a single assembly to accomplish the objects of the invention.

Figure 2:
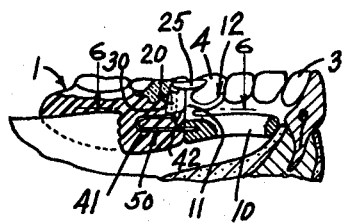
FIGURE 2 is a fragmentary sectional view on the line 2—8 of FIGURE 1 showing the denture in one position relative to the natural teeth, the denture not being under occlusial pressure.
Figure 3:
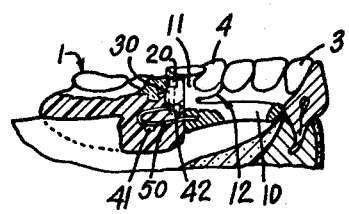
FIGURE 3 is a view similar to that of FIGURE 2, the occlusial surface of the denture being under pressure and in moved relationship to the occlusial surface of the natural teeth.

It is intended that the parts shown in FIGURES 4, 5 and 7 should be formed of a suitable metal such as a vitallium, gold, chrome, or similar metals. The stress eliminator elements as shown in FIGURES 4 and 7 have close tolerance engagement. The cantilever springs 50 and 65 for both sides of the denture securely maintain the split sockets and the tapered dowels in movable relationship and against shifting or teetering action of the dentures particularly when the cylindrical members 32 and 33, as well as the saddles are in abutting engagement with the distal ends of the posts 11. The saddles bearing the artificial teeth are not subject to stress or breakage as all stress is through the metal parts of the eliminator. The only movement of the distal extension partial denture base is vertical, that is, the occlusial surface of the denture may move below the occlusial surface of the natural teeth, as shown in FIGURES 2 and 3 with a positive return to the original position of FIGURE 2 when stress is relieved from the occlusial surface. The flange 22 of the dowel 20 acts as a stop to prevent any distal lift at the end of a saddle while the extensions 35 and 36 which engage opposite sides of web 21 prevents rotation of the saddle relative to post 11.

I claim:

1. In combination, a lingual bar provided at one end with a post and a clasp carried by said post for connection with a natural tooth, a dowel spacedly secured to the distal end of the post, a partial denture, one end of which abuts the distal end of the post and the lingual bar, said denture provided with a split socket member for receiving the dowel and a substantially U-shaped spring having two legs of different length both legs of which are embedded within the denture and the longest leg of which extends beyond the denture for engagement with the lingual bar.

2. The device as set forth in claim 1, the shortest leg of said spring engaging the split socket member.

3. The device as set forth in claim 1, said split socket member having at the split portion rounded section edges which extend above the socket member, the rounded edges being received between the dowel and the post for preventing lateral rotation and teetering action of the denture relative to the clasp and lingual bar.

4. The device as set forth in claim 1, said U-shaped spring having its shortest leg provided with a notch and said split socket member provided with a pin for reception in said notch, the spring flexing within the denture and fulcruming at the U-bend thereof during vertical movement upwardly and downwardly of the denture relative to the clasp and lingual bar.

References Cited

UNITED STATES PATENTS

| | | | |
|---|---|---|---|
| 1,735,537 | 11/1929 | Hagman | 32—5 |
| 2,611,957 | 9/1952 | Baca | 32—5 |
| 2,982,024 | 5/1961 | Thompson | 32—7 |

FOREIGN PATENTS 1,059,618  6/1959  Germany.

LOUIS G. MANCENE, *Primary Examiner.*

N. RUSHEFSKY, *Assistant Examiner.*